Patented Jan. 23, 1940

2,187,847

UNITED STATES PATENT OFFICE 2,187,847

CONDENSATION PRODUCTS OF BUTYROLACTONES AND PRIMARY AMINES OF THE AROMATIC AND HETEROCYCLIC SERIES

Hans Andersag, Wuppertal-Elberfeld, Germany, assignor to Winthrop Chemical Company, Inc., New York, N. Y., a corporation of New York No Drawing. Application June 22, 1936, Serial No. 86,691. In Germany June 27, 1935

10 Claims. (Cl. 260—344)

This invention relates to condensation products of ketolactones with primary amines of the aromatic and heterocyclic series.

In accordance with the present invention new products which are therapeutically useful, for instance as anaesthetics and parasiticides, particularly against malaria parasites are obtainable by condensation of butyrolactones which contain a keto group only attached to the lactone ring at the carbon atom standing in α-position to the carbonyl group of the lactone ring, with primary amines of the aromatic or heterocyclic series while splitting off water. Thus compounds of the type of Schiff's bases are obtained having the general formula

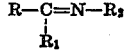

wherein R stands for an alkyl, aryl or aralkyl radical, such as methyl, ethyl, propyl, butyl, phenyl and benzyl, $R_1$ stands for the butyrolactone radical or for a substituted butyrolactone radical, such as the β-methyl-, β-ethyl- and β-hydroxymethylbutyrolactone radical, which butyrolactone radical is bound through its alpha-carbon atom, and $R_2$ stands for a radical of the aromatic, particularly the benzene and naphthalene series or of the heterocyclic series, for instance, the phenyl, naphthyl, pyrazolyl, pyridyl, quinolyl, isoquinolyl and acridyl radical and such radicals as are substituted by halogen, alkyl, hydroxyl, alkoxy-, amino-, acylamino-, alkylamino, alkylaminoalkylamino-, alkylaminoalkoxy-, carboxyl-, etherified and esterified carboxyl- and similar groups.

The new products when heated with dilute mineral acids are split to 1 mol of the amine used for the condensation, 1 mol of carbon dioxide and 1 mol of a keto-alcohol.

The new products specified above are obtained by using as bases for the condensation primary amines of the aromatic and heterocyclic series, for instance, aniline and its nuclear substitution products, aminopyridines, aminoquinolines, and also aminoalkylamino compounds of the aromatic and heterocyclic series. Suitable butyrolactones for the condensation, containing a keto group attached to the carbon atom in alpha-position to the carbonyl group, are, for instance, alpha-aceto- and alpha-benzoylbutyrolactone and also their alkyl- and hydroxy-alkyl-substitution products. The condensation preferably proceeds by heating the agents taking part in the reaction alone or in a solvent or diluent, if desired adding agents which favour the condensation in particular such as are capable of binding water.—The invention is further illustrated by the following examples, but is not limited thereto:—

*Example 1.*—12.8 grams of alpha-acetobutyrolactone are heated for 7 hours to 150° C. with 20 grams of aniline in an open vessel, whereby water separates. From the residue the new base distils under 2 mm. pressure at 190° C. as an almost colourless oil which soon solidifies to crystals melting at 82° C.

On boiling with dilute hydrochloric acid the base splits into 1 mol of aniline, 1 mol of carbonic acid and 1 mol of acetopropyl alcohol.

25.6 grams of alpha-aceto-butyrolactone are heated with 30 grams of para-anisidine for 5 hours at 150° C. in an open vessel. Then 50 ccs. of alcohol are added and the solution filtered. The crystal magma precipitating is filtered with suction and washed with ether. The new compound melts at 98° C.

When using instead of para-anisidine the same quantity of ortho-toluidine colorless crystals melting at 76–77° C., when using meta-chloro-aniline crystals melting at 70–71° C. are obtained.

14 grams of alpha-aceto-butyrolactone are heated in an open vessel with 14 grams of para-phenetidine for 6½ hours to 170° C. The new compound distils under 11 mm. pressure at 205° C. as a light yellow oil which soon solidifies to crystals. The melt melts at 77° C. when recrystallized from alcohol.

12.8 grams of alpha-aceto-butyrolactone are heated with 22 grams of para-aminophenol-diethylaminoethylether in 20 ccs. of alcohol for 5 hours to 130° C. The new base distils as a light yellow oil under 2 mm. pressure at 260° C.

12.8 grams of alpha-aceto-butyrolactone are heated in a closed tube with 16.4 grams of para-diethylamino-aniline for 8 hours to 150° C. The new base distils at 220° C. under 1 mm. pressure as a reddish oil which soon crystallises. On treatment with ether the distillate immediately becomes powdery. The powder is filtered with suction, washed and dried. The slightly yellow substance melts at 88° C.

14 grams of alpha-aceto-butyrolactone are heated in an open vessel with 15 grams of para-aminoacetanilide for 5 hours to 180° C. The reaction mixture which is still warm is dissolved in about 300 ccs. of alcohol and left to cool. The crystal mass precipitating is filtered with suction, washed with a small quantity of alcohol and dried. The new compound melts at 181° C.

*Example 2.*—12.8 grams of alpha-aceto-butyrolactone are heated with 10.9 grams of 2,6-diaminopyridine in 10 ccs. of alcohol in a closed tube for 5 hours to 140° C. The crystal magma precipitating is filtered with suction and washed with alcohol. The new compound obtained by condensation of 1 mol of diaminopyridine with 1 mol of lactone with splitting off of water melts at 167° C. It is almost insoluble in water and alcohol, soluble in acids.

Example 3.—12.8 grams of alpha-aceto-butyrolactone are heated in a closed tube with 21 grams of 1-phenyl-2,3-dimethyl-4-amino-5-pyrazolone for 8 hours to 150° C. The reaction mixture is digested in the hot with a small quantity of alcohol and the crystal magma which has precipitated after cooling is filtered with suction. The new compound melts at 187° C. when recrystallized from a large quantity of alcohol.

Example 4.—12.8 grams of alpha-aceto-butyrolactone are heated in a closed tube with 18 grams of 6-methoxy-8-aminoquinoline in 20 ccs. of alcohol for 5 hours to 130° C. After cooling, the crystal mass separating is filtered with suction and recrystallized from a large quantity of alcohol. The new compound obtained with the splitting off of water melts at 172° C. and forms a yellow hydrochloride which is difficultly soluble in cold water.

Example 5.—6 grams of alpha-aceto-butyrolactone are heated in a closed tube with 12 grams of 6-amino-8-diethylaminoethoxyquinoline in 5 ccs. of alcohol for 5 hours to 130° C. The fraction obtained by distillation of the reaction mixture under 3 mm. pressure at about 220° C. is treated with ether on the water bath until the oil becomes powdery. The powder is filtered with suction and dried. The new compound melts at 113° C. and is readily soluble in acids.

Example 6.—4 grams of alpha-aceto-butyrolactone are heated in a closed tube with 6 grams of 2-methoxy-6-chloro-9-aminoethylaminoacridine in 20 ccs. of alcohol for 8 hours to 150° C. The crystal magma separating after cooling is filtered with suction and washed with a small quantity of alcohol. The new compound forms light olive green crystals, is not yet melted at 300° C. and is insoluble in dilute acids.

Example 7.—16.5 parts by weight of para-amino-benzoic acid ethyl ester and 12.8 parts by weight of alpha-aceto-butyrolactone are slowly distilled with 200 parts by weight of carbon tetrachloride. The solution is concentrated, treated with ether and strongly cooled, whereby the reaction product formed with the splitting off of water separates in crystals melting at 102° C.

Example 8.—15 grams of alpha-aceto-butyrolactone are heated in a closed tube with 27.25 grams of para-aminobenzoic acid diethylamino-ethylester-hydrochloride in 150 ccs. of alcohol for 8 hours to 150° C. After distilling off the alcohol the solution is rendered alkaline with potassium carbonate, extracted with ether and the ethereal solution is distilled. The new base distils as a light yellow oil under 0.5 mm. pressure at 250–260° C. The same base is obtained by re-esterifying the compound of Example 7 by 6 hours' heating with diethylaminoethanol at 190–200° C.

Example 9.—20 grams of alpha-aceto-butyrolactone are heated with 28.65 grams of para-amino - benzoic-acid-(1.2-dimethyl-3-dimethylaminopropyl)-ester-hydrochloride in 200 ccs. of alcohol for 8 hours to 150° C. Working up is effected as indicated in Example 8. The new compound formed with the splitting off of water distils as a light yellow oil under 1 mm. pressure at 265° C.

The same compound is obtained by heating the free aminobenzoic acid ester with the lactone alone or in alcohol or toluene, or by heating or several days' standing of the components in glacial acetic acid.

Example 10.—10 grams of alpha-aceto-butyrolactone are heated in a closed vessel with 11 grams of 6-methoxy-8-aminoethylaminoquinoline for 8 hours to 150° C. The new base obtained with the splitting off of water distils under 1 mm. pressure at 280° C. as a thick yellow oil which soon solidifies to crystals. The compound melts at 127° C. when recrystallised from alcohol.

24 grams of alpha-aceto-butyrolactone are heated in a closed tube with 23.1 grams of 6-methoxy-8-aminopropylamino-quinoline for 8 hours to 150° C. The new base formed with the splitting off of water distils as a thick reddish oil under 2 mm. pressure at 285° C.

4 grams of alpha-aceto-butyrolactone are heated as specified above with 4.9 grams of 6-methoxy-8-aminobutylamino-quinoline. The new base distils as a light yellow oil under 2 mm. pressure at 312° C.

Example 11.—5 grams of alpha-aceto-beta-methyl-butyrolactone, obtainable by condensation of methylethylene oxide (propylene oxide) with acetoacetic ester, are heated in a closed tube with 6.5 grams of 6-methoxy-8-aminoethylamino-quinoline for 8 hours to 150° C. The new base formed with the splitting off of water distils under 1 mm. pressure at 265° C. It can be transformed into the hydrochloride by dissolving in acetone and precipitation with ethereal hydrochloric acid. The hydrochloride is nonhygroscopic and melts at 211° C. with decomposition.

The base obtained as indicated above from alpha-aceto-beta-methyl-butyrolactone and 6-methoxy- 8 -(amino-n - butylamino)-quinoline distils as a thick yellow oil under 1 mm. pressure at about 295° C.

The base obtained from alpha-aceto-beta-methyl-butyrolactone and 6-methoxy-8-(amino-n-pentylamino)-quinoline distils as a thick yellow oil under 1 mm. pressure at 300° C.

By condensation of 6-methoxy-8-(amino-n-butylamino)-quinoline with alpha-propionyl-butyrolactone (prepared by reacting upon propionyl acetic acid ethyl ester with ethylene oxide) a thick yellow oil is obtained which boils from 290 to 300° C. under 1 mm. pressure.

Example 12.—3.16 grams of alpha-aceto-beta-hydroxy-methyl-butyrolactone (obtainable by condensation of glycide with aceto-acetic ester) are heated in a closed tube with 4.6 grams of 6-methoxy-8-aminopropylamino-quinoline for 8 hours to 150° C. The new base formed with the splitting off of water distils at 270° C. under 1 mm. pressure.

I claim:

1. Condensation products of the general formula

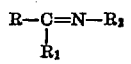

wherein R stands for a radical selected from the group consisting of alkyl, phenyl and benzyl radicals, $R_1$ stands for a butyrolactone radical which is linked through its alpha-carbon atom and $R_2$ stands for a phenyl carboxylic acid ester radical.

2. Condensation products of the general formula

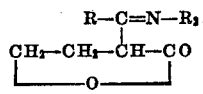

wherein R stands for a radical selected from the group consisting of alkyl, phenyl and benzyl radicals and $R_2$ stands for a phenyl carboxylic acid ester radical.

3. Condensation products of the general formula

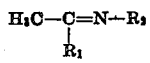

wherein $R_1$ stands for a butyrolactone radical which is linked through its alpha-carbon atom and $R_2$ stands for a phenyl carboxylic acid ester radical.

4. Condensation products of the general formula

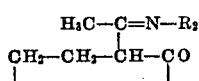

wherein $R_2$ stands for a phenyl carboxylic acid ester radical.

5. Condensation products of the general formula

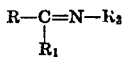

wherein R stands for a radical selected from the group consisting of alkyl, phenyl and benzyl radicals, $R_1$ stands for a butyrolactone radical which is linked through its alpha-carbon atom and $R_2$ stands for a phenyl-para-carboxylic acid aminoalkyl ester radical.

6. Condensation products of the general formula

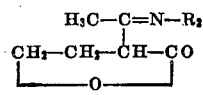

wherein $R_2$ stands for a phenyl-para-carboxylic acid aminoalkyl ester radical.

7. Condensation products of the general formula

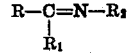

wherein R stands for a radical selected from the group consisting of alkyl, phenyl and benzyl radicals, $R_1$ stands for a butyrolactone radical which is linked through its alpha-carbon atom, and $R_2$ stands for a radical a nuclear carbon atom of which is directly linked to the nitrogen atom selected from the group consisting of phenyl radicals and naphthyl radicals.

8. Condensation products of the general formula

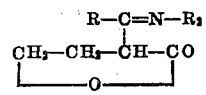

wherein R stands for a radical selected from the group consisting of alkyl, phenyl and benzyl radicals and $R_2$ stands for a radical a nuclear carbon atom of which is directly linked to the nitrogen atom selected from the group consisting of phenyl radicals and naphthyl radicals.

9. Condensation products of the general formula

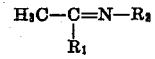

wherein $R_1$ stands for a butyrolactone radical which is linked through its alpha-carbon atom, and $R_2$ stands for a radical a nuclear carbon atom of which is directly linked to the nitrogen atom selected from the group consisting of phenyl radicals and naphthyl radicals.

10. Condensation products of the general formula

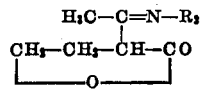

wherein $R_2$ stands for a radical a nuclear carbon atom of which is directly linked to the nitrogen atom selected from the group consisting of phenyl radicals and naphthyl radicals.

HANS ANDERSAG.